March 3, 1970  W. R. BROWN  3,498,130
PRESSURE OPERATED TRANSDUCER-CONTROLLER
Filed May 23, 1967  3 Sheets-Sheet 2
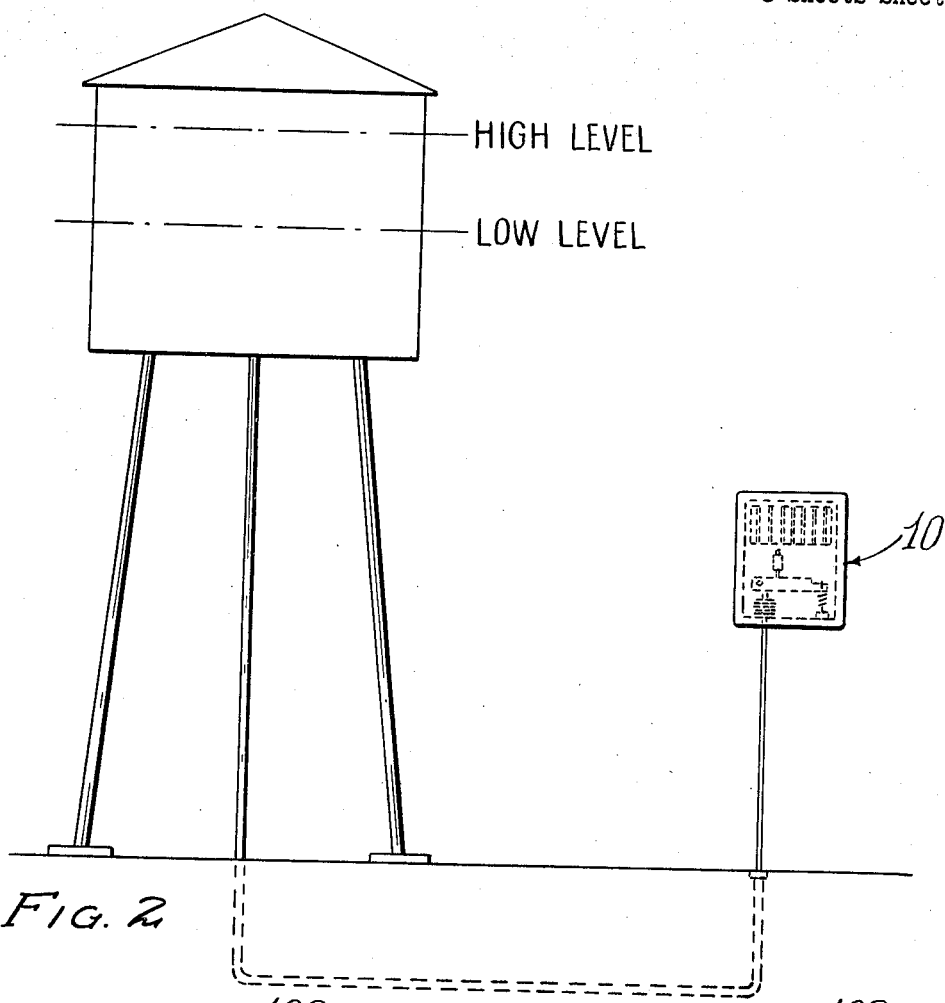
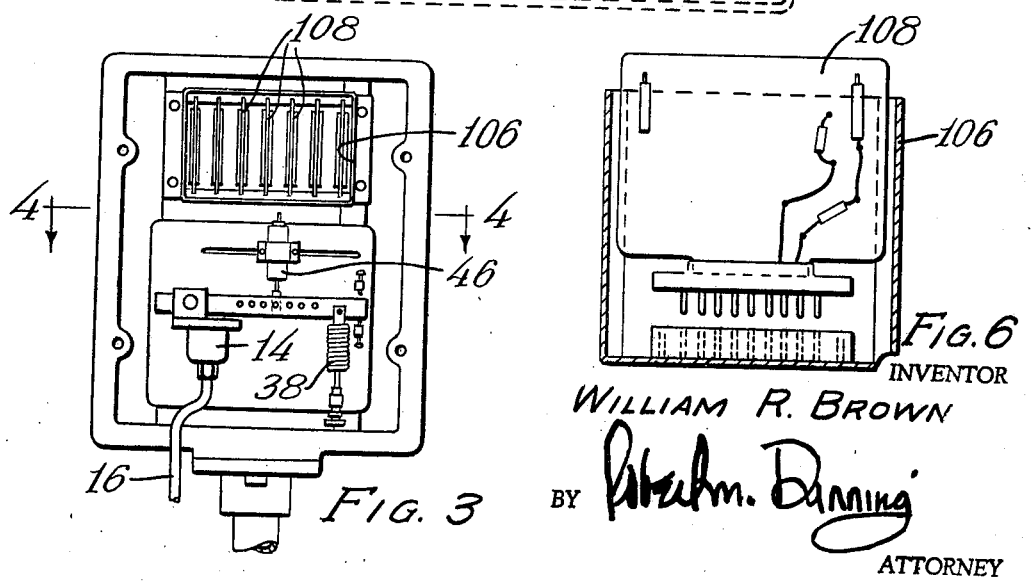
INVENTOR
WILLIAM R. BROWN
BY
ATTORNEY March 3, 1970 — W. R. BROWN — 3,498,130
PRESSURE OPERATED TRANSDUCER-CONTROLLER
Filed May 23, 1967 — 3 Sheets-Sheet 3

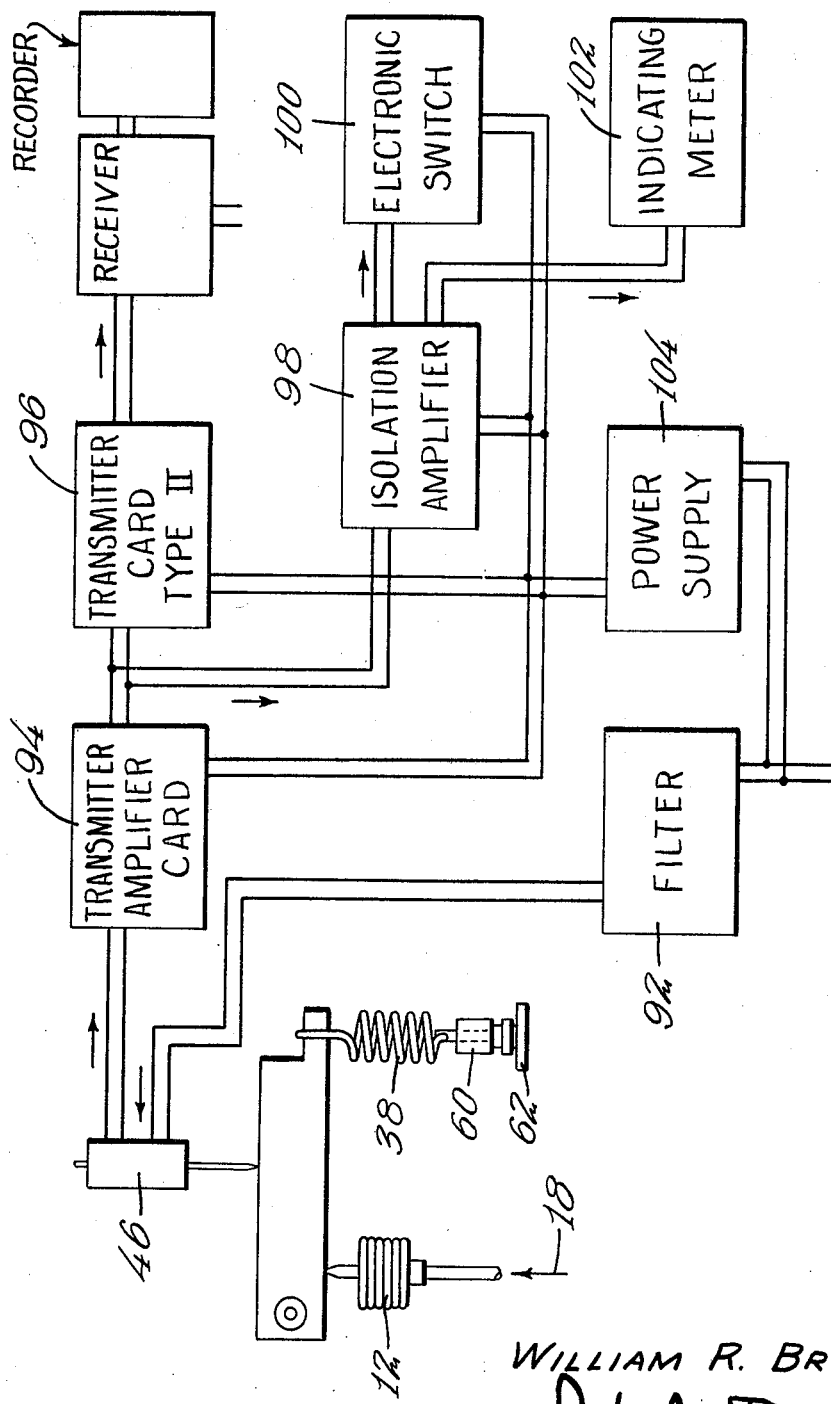

INVENTOR
WILLIAM R. BROWN
BY Robert M. Dunning
ATTORNEY

United States Patent Office 3,498,130
Patented Mar. 3, 1970

3,498,130
PRESSURE OPERATED TRANSDUCER-CONTROLLER
William R. Brown, St. Paul, Minn., assignor, by mesne assignments, to Control Data Corporation, Minneapolis, Minn., a corporation of Minnesota
Filed May 23, 1967, Ser. No. 640,718
Int. Cl. G01f 3/20
U.S. Cl. 73—301                                    6 Claims

ABSTRACT OF THE DISCLOSURE

A pressure operated transducer-controller having a diaphragm or bellows responsive to changes in liquid pressure to activate a spring loaded beam adjacent one end. Linear movement of the beam is transduced to a linear voltage by a linear variable differential transformer (LVDT) actuated by beam movement. Preferably the LVDT is connected to a solid state plug in circuit board. Suppression up to 80 percent is obtained by a pre-loaded spring and adjustment of the beam.

SUMMARY OF THE INVENTION

This application relates to a temperature compensated solid state telemetering system including a sensing unit sensing changes in liquid pressures in closed systems and circuit board card assemblies including a transmitter, a receiver, isolation amplifier, linear voltage differential transformer, amplifier, and power supply.

The pressure operated transducer-controller consists of a diaphragm or bellows, a force balance mechanism operating a linear variable differential transformer, seven solid state, plug-in printed circuit boards which provide the powering: a DC power suply, a filter, an amplifier, an isolation amplifier, six SPDT controls (or alarm) switches. Pressure indicators, thermostatically controlled freezing protection, and an electronic time impulse transmitter module may be provided if desired.

Pressure measurements are monitored by the transducer control up to 100 pounds per square inch (p.s.i.) (231 feet) and converted by means of the high speed solid-state circuitry to control the functions. The force balance mechanism includes a pre-loaded spring which together with adjustments to be made to the beam enable suppression of up to 80 percent. Zero and span adjustments within the selected transducer range can be readily made in the field by utilizing trimming potentiometers for each adjustment. These functional circuits are on separate 3 inch or 4 inch printed plug-in circuit boards. Thus all replacements of the circuit boards are readily accomplished by pulling out the inoperative circuit board and plugging in its replacement, or by adding additional boards. Accordingly, it will be understood that maintenance problems have been reduced to an absolute minimum.

With the present device, an overall system accuracy is within ±1 percent of the range selected. The range of the pressure transducer is between 0 to 100 p.s.i. (0 to 123 feet). The accuracy of the transducer is such that specific range within this limit can be factory set as required.

The sensing unit generates a signal by means of the linear variable differential transformer, the signal (input voltage) being transmitted by the sensing unit to the card circuit transmitter. The card circuit transmitter output is a series of square wave pulses (timed impulses) which are received by the receiver. A receiver converts the transmitter impulses to direct current voltage that is proportional to the width of the pulses. Local indications of pressure may be provided at the transmitter or alternatively suitable gauges or meters, local alarms, controls and the like may be provided.

It is an object of the present invention to provide a pressure operated primary sensing unit including a pivoted balance beam having a pair of moment arms, a bellows or diaphragm responsive to changes of pressure acting against one of the arms of the beam, a suppression means such as a pre-set spring acting against the other arm of the beam, a linear voltage differential transformer (LVDT) connected to the beam actuated by movement of the beam to provide an output indicative of the liquid pressure. In preferred construction, the LVDT is connected to printed circuit card components.

It is a further object of the present invention to provide a pressure operated solid state transmitter circuit card or board to transmit readings for remote recording and/or indication of pressure in enclosed systems having necessary electrical components to generate a pulse signal at pre-determined intervals for the length proportional to the input signal, the circuit board preferably being a printed circuit.

It is a further object to provide a receiver circuit board which regenerates the transmission pulse signal, converting the transmission pulse signal into direct current voltage, and providing a receiver output signal which may be used to actuate an indicator, recorder, or other measuring device. In preferred construction the receiver is also a printed circuit board.

It is a further object of the present invention to provide an electronic transmitter utilizing a printed circuit board. The transmitter utilizes the input from the LVDT. Further, it is an object of the present invention to provide an electronic receiver circuit board which is preferably printed circuit.

An isolation amplifier having a high input impedance and low output impedance is provided which in preferred form is a printed circuit card or board. One isolation amplifier circuit board assembly may be used to drive from 1 to 6 electronic switches. Further, additional circuit board amplifier assemblies may be provided as necessitated. One isolation amplifier circuit board assembly with 0–500 microampere output may be used in transmitters requiring an API meter and/or 1 to 6 electronic switches.

It is a further object of the present invention to provide a linear voltage differential transformer filter in the form of a printed circuit card to filter 60 cycle alternating current to reduce harmonics and to reduce the current to the voltage necessary for the primary input of the linear voltage differential transformer (LVDT).

It is a further object of the present invention to provide an amplifier printed circuit board to amplify, rectify and filter the LVDT secondary voltage thereby providing a controlled voltage for the transmitter and further providing a direct current voltage for the transmitter timing circuit varying proportionally with the usual 115 volt alternating current service thus eliminating a variable input to the LVDT.

The LVDT filter and amplifier circuit boards are preferably assembled on two printed circuit boards.

It is a further object of the present invention to provide a power supply in the form of printed circuit cards. The power supply is divided into three different levels of current and voltage although obviously additional levels could be set up if desired for any reason.

It is an advantage of the particular invention that except for re-calibration no maintenance is required. In the event of a malfunction, a new card will be used as a replacement. Therefore, in the present arrangement moving parts are reduced to a minimum.

These and other particular objects and advantages will be more particularly described and detailed when taken in conjunction with the accompanying specification and drawings.

DESCRIPTION OF THE DRAWINGS

FIGURE 1 is a schematic drawing illustrating the component arrangement and circuitry of the solid state pressure transducer-controller.

FIGURE 2 is a view illustrating the pressure transducer-controller for use with an elevated tank.

FIGURE 3 is an enlarged view showing the pressure operated transducer of FIGURE 2, coupled printed circuit boards, and enclosing case.

FIGURE 6 is a sectional view illustrating the circuit card and case relationship and the accessibility of the circuitry.

DESCRIPTION OF THE INVENTION

Figure 5:
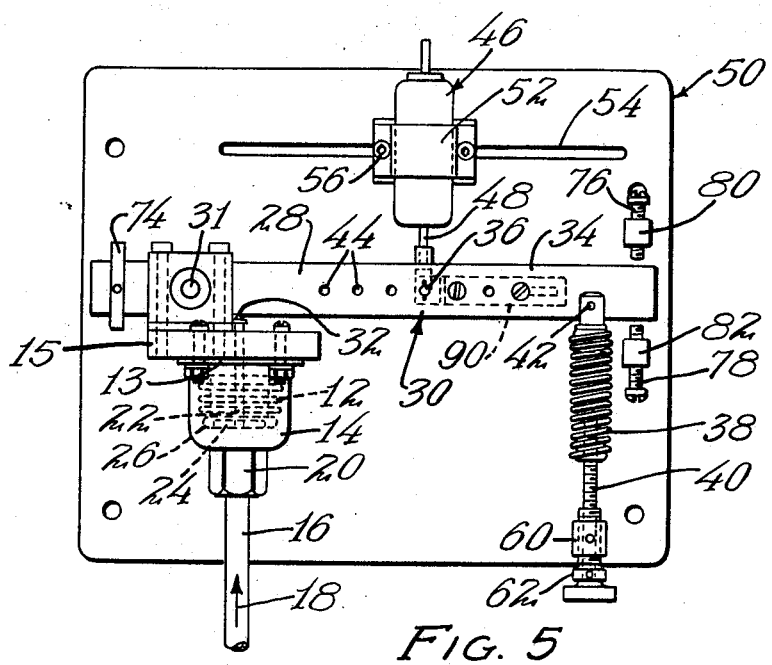
FIGURE 5 is an enlarged view of the pressure operated transducer.

As may be seen in FIGURE 5, the pressure operated transducer-controller generally numbered 10 includes a diaphragm or bellows 12 enclosed in a case 14 to which liquid pressure is supplied by appropriate tubing 16, the direction of pressure in the tubing 16 being indicated by the arrow 18. A suitable coupling 20 connects the tubing to the bellows 12 in a manner which is well known. As several commercially acceptable ways of providing a liquid tight connection are known and available it is believed that further description is not necessary.

Preferably the bellows 12 is made of brass or other non-corrosive material.

Movement of the bellows 12 produces related movement of a shaft 22 having a pressure surface 24 secured integrally to the bottom end 26 of the bellows 12. The other end of the stem of shaft 22 is engageable with a moment arm 28 of a balance beam 30 as indicated at 32. The beam 30 is divided into a pair of moment arms 28 and 34 by a pivot 36. To counter or suppress movement of the arm 28 resulting from engagement with the moving stem 22, a suppression member such as a spring 38 is provided. In preferred construction the spring is mounted on a threaded shaft 40 such as a bolt whereby rotation of the shaft 40 will cause the spring 38 to move toward or away from the moment arm 34. The other end of the spring 38 is secured as indicated at 42 to the arm 34 in any suitable manner such as by a bifurcated flange and pin arrangement whereby some pivoting of the arm in connection with the spring may occur.

A series of holes are provided in spaced relation through the beam 30 enabling the pivot 36 to be engaged at a variety of places along the beam for a purpose which will be described. The holes are similar and have been given the numeral 44.

Connected to the beam 30 at the pivot point 36 is a linear variable differential transformer (LVDT) generally numbered 46. The LVDT 46 is connected to the beam 30 by the pivot 36 which preferably is a detachable pin engaged in one of the holes 44. A shaft 48 connects the LVDT to the pin 36. Suitable bracketing (not shown) holds the LVDT in position within the housing 50. Such bracketing may comprise a strap 52 encircling the LVDT and engaging movably in a slot 54 as by a bolt and strap 56, 58 or in any suitable manner to enable the LVDT to be moved laterally in relation to the beam 30 as required.

As may be seen in FIGURE 5, the bellows 12 and spring 38 are fixed in relation to the housing 50. The spring 38 is anchored to the housing 50 by a suitable lock nut arrangement 60, 62 whereby the spring tension may be preset.

It will be apparent that movement of the beam 30 is induced by variations in pressure applied to the bellows 12, and that this movement of the beam will continue until counter-balanced by the spring. The LVDT is connected to the beam at a point which will provide the required motion of the LVDT slug for the pressure range through which the device is required to operate.

It will be obvious that by using bellows of different effective areas and springs with different resistances and by situating the LVDT at different points along the beam, that it is possible to provide the required motion of the LVDT slug for desired pressure ranges.

The housing 50 for accessibility of components and for ease of construction is composed of a front housing 64 for a rear housing 66.

Figure 4:
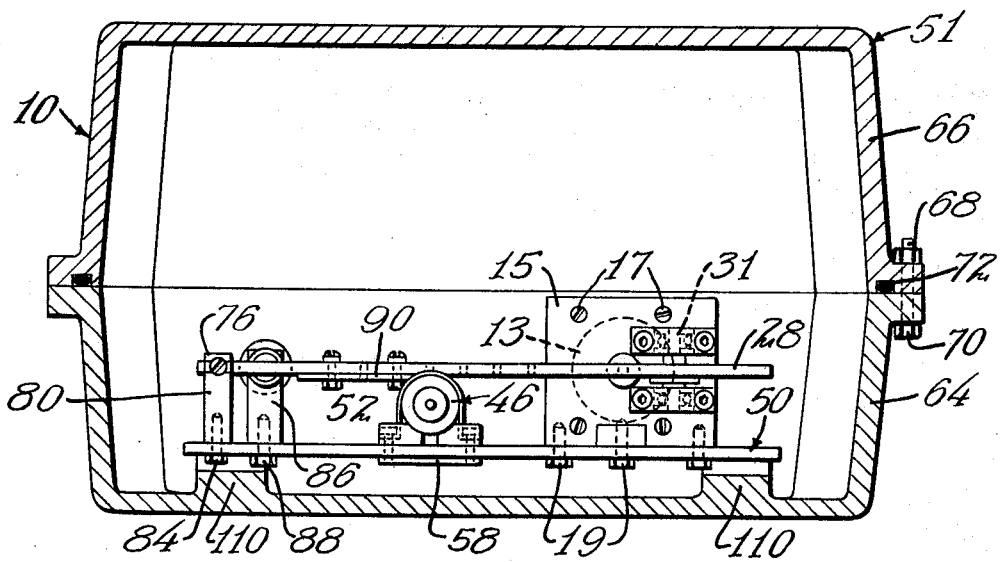
FIGURE 4 is an enlarged cross-section taken along the lines 4—4 of FIGURE 3.

As may be observed in FIGURE 4 the front housing 64 is joined to the rear housing 66 in any suitable manner as by bolts 70 and nuts 68. A gasket 72 is suitably mounted between the edges of the housings to protect the components from the elements.

A counterweight 74 is preferably provided at the other end of the beam 30 from the spring 38, the counterweight being slidable along the arm 28 to any desired point. The counterweight is used to counterbalance the weight of the beam to obtain a zero reading.

It will be understood that the bellows and spring may be mounted above the beam as well as in the positions shown and such variations are believed obvious.

Adjustable limit stops 76 and 78 are provided at the spring end of the arm 34 to limit movement of the arm. the stops 76 and 78 are illustrated as being threadably mounted in mounting blocks 80 and 82. Other suitable arrangements will readily suggest themselves. As indicated in FIGURE 4, the mounting blocks may be secured to the housing 64 by a fastener such as a screw 84.

A stabilizing arm 86 may be secured to the upper end of the spring 38 at one end with the other end of the arm 86 secured to the housing 64 by a fastener 88.

In order to give the spring 38 some slight preloading a force can be applied to the short end of the beam 30. This may be accomplished through the use of a weight 90 as illustrated in FIGURES 4 and 5 as being adjustably positioned on the beam 30.

The bellows 12 includes a head end 13 secured to a mount 15 by fasteners 17, the mount being secured to the housing 64 by suitable fasteners 19.

Pressure ranges of 0–10 to 0–100 p.s.i. (0–23 to 0–231 feet) may be secured. Pressure ranges above these may be obtained by suitable alteration of the device.

Turning to FIGURE 1, alternating current excitation voltage for the LVDT is furnished through the filter card 92. The output of the LVDT is amplified and rectified in the amplifier card 94 providing an output voltage (DC) proportional to the position of the core or slug of the LVDT. The DC output of the transmitter amplifier card is fed to the transmitter card 96. This is a particular transmitter card designed to accommodate the LVDT input as will be further described. The output of the transmitter card 96 is a series of DC pulses of timed on and off duration. Preferably each pulse starts 90 milliseconds after the start of the proceeding pulse. The width of the pulse will be proportional to the input voltage and from 15 to 75 milliseconds long.

Where switches are desired for local control or alarm circuits, the output of the transmitter amplifier is fed through an isolation amplifier card 98 to to electronic switch card 100. By feeding the output of the transmitter amplifier through the isolation amplifier non-linearity due to loading is prevented.

The isolation amplifier card 98 may be used to drive an indicating meter 102.

A common power supply 104 in the form of a printed circuit card supplies the power for all units.

As has been indicated the telemetering transmitter transmits readings for recording remotely and/or indicating level in tanks or reservoirs or pressures in closed systems. As may be seen in FIGURE 2 readings at and between low and high levels in a reservoir may be desired. Suppression of the pressure ranges indicated supra may be obtained up to 80 percent of the pressure range for use on elevated tank applications by the transmitter.

It will be understood the transducer 10 when coupled with the electronic circuit cards to be further described is referred to as a transmitter.

It will be further understood that for low pressures the bellows 12 illustrated may be replaced by a diaphragm pot (not illustrated) or a differential diaphragm pot for flow measurement.

Returning to FIGURE 5, the spring 38 is calibrated thus enabling adjustment to suit the degree of suppression desired. Adjustment of the spring by rotation of the thumbscrew 62 adjusts the suppression.

Zero and span adjustments within the selected range can be made through the use of trimming potentiometers.

It has been found that the overall system accuracy is of the order of ±1 percent of the range selected.

Returning again to FIGURE 5, the beam 30 is supported preferably on a fulcrum point 31 which is preferably a stainless steel ball bearing. Various other pivots such as knife edge or torsion could similarly be employed.

As may be seen in FIGURE 3, the card box 106 comprises a group of solid state, splug-in boards or cards having printed circuits. For example, each card box may hold 7 plug-in circuit boards. The card box is mounted in the housing 50 with all wires brought out to a terminal board ont the bottom of the card box. FIGURE 6 illustrates such arrangement. For ease of description the printed circuit cards are generally numbered 108.

The power supply for the pressure operated transmitter is 120 volt, 50 or 60 cycle input. There has been previous indication as to how such voltage is used in connection with the description of FIGURE 1.

The housing 50 is preferably of aluminum and has bosses 110 for wall mounting. Alternatively pedestal mounting may be used.

A resistance heater may be utilized to protect the hydraulic line from freezing.

It will be understood that the pressure operated transducer-controller and card components described in combination enable superior results to be obtained. However, alternative circuitry might be used if desired for any reason in lieu of the printed circuit cards.

As previously indicated, in the printed circuit combination utilized with the transducer-controller, the transmitter is designed to receive an input from the LVDT through the LVDT amplifier. The receiver is designed for a 0–1 volt output, and is used to operate a Taylor recorder. The isolation amplifiers assembly is unity gain amplifiers having a high input impedance and low output impedance.

The isolation amplifier is used in addition to a receiver when electronic switches are required as previously indicated. An isolation amplifier is used with a transmitter wherever an electronic switch is required or the transmitter is used with an API meter. The high input impedance to the isolation amplifier prevents non-linearity in the telemetering system due to circuit loading when the electronic switches are installed. One isolation amplifier as previously indicated may be used to drive 1 to 6 electronic switches.

LVDT filter and amplifier printed circuit boards filter the 60 cycle AC to remove harmonics and reduce it to the voltage necessary for the LVDT primary input, amplify, rectify and filter secondary voltage of the LVDT to provide a control voltage to the transmitter, and thirdly provide a DC voltage for the transmitter timing circuit that varies proportionally with the 115 volt AC service to cancel the variations in the input to the LVDT. Two circuit boards provide the assembly.

The LVDT filter is assembled on one board and the amplifier is assembled on another board. The filter accomplishes objective one and the amplifier board accomplishes objective two and three.

The power supply is solid state plug-in board requiring 120 volt, 50 or 60 cycle input. The power supply provides proper voltage for the pressure transducer to change mechanical motion into voltage signal.

Freezing protection may be obtained by providing a thermostatically controlled resistance heater to protect the hydraulic lines in the enclosure which is preferably non-corrosive. The assembly may be pedestal or wall mounted.

I claim:

1. A liquid level telemetering pressure controller for use in indicating liquid level in a tank, the controller being capable of transmitting pressure readings in closed systems comprising:
   a diaphragm pressure sensor connected to the tank for actuation by variations in liquid level therein,
   a pressure to voltage transducer including a balance arm actuated by said diaphragm upon variations in pressure in said sensor,
   a linear variable differential transformer engaging said balance arm for actuation thereby,
   an alternating current supply supplying current to said linear variable differential transformer.
   a solid state amplifier for amplifying signals produced by said linear variable differential transformer by movement of said balance arm,
   a power supply for said amplifier,
   a solid state time impulse transmitter connected to said amplifier and said power supply to convert the signal into pulses of a width determined by the signal received,
   a receiver for converting the signal pulses to a D.C. voltage proportional to the width of the pulses received,
   a transmission line connecting said transmitter and said receiver, and
   electronic switch means connected to said power supply and actuated by current from said transmitted amplifier.

2. The structure of claim 1 and including suppression means resisting movement of said balance arm.

3. The structure of claim 2 and in which said suppression means includes a pre-loadable spring.

4. The structure of claim 1 and including an isolation amplifier connected between said transmitter amplifier and said electronic switch.

5. The structure of claim 1 and in which said transmitter, receiver, electronic switch and power supply are printed circuit card assemblies.

6. The structure of claim 1 and in which said transmitter output is a series of timed pulses having a pulse width proportional to the position of the differential transformer.

References Cited

UNITED STATES PATENTS

| | | | |
|---|---|---|---|
| 3,042,911 | 7/1962 | Paradise et al. | |
| 3,211,004 | 10/1965 | Spencer | 73—398 |
| 3,182,457 | 5/1965 | Sato et al. | 340—244 XR |
| 3,237,449 | 3/1966 | Brandt | 73—398 XR |
| 3,286,528 | 11/1966 | Jullien-Davin | 73—398 |

DONALD O. WOODIEL, Primary Examiner

U.S. Cl. X.R.

73—398